United States Patent Office 3,208,827
Patented Sept. 28, 1965

3,208,827
METHOD FOR RAPID QUANTITATIVE ANALYSIS OF ETHYL ALCOHOL
Robert F. Borkenstein, 821 S. High St., Bloomington, Ind.
No Drawing. Filed Apr. 30, 1962, Ser. No. 191,248
6 Claims. (Cl. 23—230)

This invention relates to a novel process for the rapid quantitative analysis of ethyl alcohol and to certain novel compositions useful in that process.

The problem of the chemical analysis of ethyl alcohol or grain alcohol has occupied the time and thoughts of many people for the past one hundred years. First, in the late 19th Century there was a need for determining the amount of ethyl alcohol in various pharmaceutical preparations such as elixirs and tinctures. Next, with the advent of legislation for the federal control of alcoholic beverages, it became necessary to determine the amount of ethyl alcohol in a beverage for the purpose of proper labeling, manufacturing and later taxing such beverages. Then, with the coming of prohibition, there arose a demand for accurate analysis of both ethyl and methyl alcohol in mixtures thereof, said mixtures being provided by bootleggers, rum runners, operators of illicit distilleries and makers of home-brew. With the collapse of prohibition and the subsequent increase in consumption of alcoholic beverages, there came an increased awareness on the part of the medical profession of the problem of drunkenness. Consequently, a need arose for more accurate methods for detecting ethyl alcohol in the blood. Most of these analytical procedures were dependent upon an oxidation of ethyl alcohol to acetaldehyde or to acetic acid, with the amount of oxidizing agent consumed being a measure of the amount of alcohol present.

In one of the above analytical procedures was speed a factor. However, since the late 1930's, the increased number of deaths on the highway and the large number of those deaths attributable to drunken drivers, have necessitated the development of rapid methods of determining whether a driver stopped by the police was under the influence of alcohol. Soon the idea of analyzing the breath of a suspected individual for alcohol, rather than his blood as formerly, began to gain acceptance. Originally, the subject suspected of drunken driving inflated a balloon and the air in the balloon was analyzed. More recently, with the development of the Breathalyzer, the subject could breath directly into a sample container of known capacity. The measured volume of air was then passed through an oxidizing solution and the amount of ethyl alcohol in the volume of exhaled breath determined as before by the amount of color change in the oxidizing solution.

With the widespread use of the Breathalyzer and other similar machines, a more rapid analytical method for ethyl alcohol in breath was needed since it was not possible to keep large numbers of motorists suspected of drunken driving in custody while the requisite analytical procedures were being carried out. Yet at the same time, the analytical method had to be a sensitive one since only minute quantities of ethyl alcohol present were involved. In addition, the chemistry had to be straightforward since many persons without special chemical skills would be using the procedure. Finally, it was preferable that the actual determination of the amount of oxidizing agent consumed should be by photometric means instead of by titration, etc.

In fulfillment of the above criteria, this invention provides a method for the rapid determination of ethyl alcohol comprising the oxidation of ethyl alcohol to acetic acid using as the oxidizing agent a soluble chromate salt plus a heavy metal catalyst in sulfuric acid solution.

A specific embodiment of this invention provides a method for the rapid quantitative estimation of the amount of ethyl alcohol in a breath sample which comprises passing a known volume of breath into an aqueous solution containing from 40 to 60% sulfuric acid by volume, a water soluble chromate salt and a heavy metal catalyst, the concentration of the heavy metal catalyst being from about 25% to about 200% that of the chromate salt, and then determining the degree of color change in the chromate solution as a measure of the amount of ethyl alcohol oxidized to acetic acid.

In another aspect of this invention, there is provided a novel composition for the rapid quantitative estimation of ethyl alcohol comprising a solution containing from 40 to 60% sulfuric acid by volume, a water soluble chromate salt, and a heavy metal catalyst, the concentration of said heavy metal catalyst being from about 25% to about 200% that of said chromate salt concentration.

In the above processes and compositions, the term "chromate salt" includes both chromate and dichromate salts since chromium has a valence of +6 in both instances. Among the water soluble chromates which are useful in my invention are the alkali chromates including potassium chromate, sodium chromate, potassium dichromate, and sodium dichromate. The concentration of soluble chromate salt in the sulfuric acid solutions should be at its lower limit about 25% more than the minimum concentration sufficient to oxidize the largest amount of ethyl alcohol to be expected in 10 ml. volume of exhaled breath. On the other hand, the maximum concentration of chromate salt in the sulfuric acid is regulated by the necessity for having a color change of sufficient magnitude to afford the degree of sensitivity required by the analytical method. In analyzing ethyl alcohol in breath, I prefer to employ a chromate salt concentration in the range .05 to 5 grams per liter of solution.

The concentration of heavy metal catalyst in the above procedures and compositions means the concentration of the heavy metal in itself in solution and not the concentration of the entire heavy metal salt. The heavy metal catalysts useful in my novel processes and compositions include metals of the first sub-group of the Periodic Table, particularly silver and those of the second sub-group including zinc and mercury.

Other suitable catalysts include salts of palladium and platinum. In general, the heavy metal salt employed as a catalyst should be substantially colorless in a 40–60% (by volume) sulfuric acid solution. Among the above catalysts, I have found that, in general, a soluble silver salt gives the most satisfactory catalysis and constitutes a preferred catalytic embodiment of this invention. While a catalytic quantity of a heavy metal salt means an amount of catalyst somewhere from 25% up to about 200% the concentration of the oxidizing agent, I find it expedient to use an amount of catalyst about equal to the concentration of chromate salt.

In the novel compositions of this invention, the concentration of sulfuric acid in the water is highly critical, and must be in the range of 40–60% by volume. Use of sulfuric acid concentrations outside of the above range results in an oxidation reaction which is either too slow or is not quantitative in that the concentration of ethyl alcohol in the breath will be found to be higher or lower than that actually present.

As is usual with chemical reactions, the higher the reaction temperature, the more rapidly the reaction goes to completion, with the general rule being that a 10° C. rise in temperature will double the reaction rate. However, when ethyl alcohol is being absorbed and oxidized, there is a practical upper limit for the reaction temperature because of the low boiling point of ethyl alcohol and the necessity of avoiding the loss of any of that material by distillation from the reaction mixture. I prefer to maintain the oxidizing solution at about room temperature for convenience since the oxidation of ethyl alcohol by a chomate salt, as catalysed by silver nitrate, for example, is sufficiently rapid and quantitative so that higher temperatures need not be used. Furthermore, the sulfuric acid solution absorbs the ethyl alcohol in the breath sample more rapidly at room temperature than at higher temperature.

This invention is further illustrated by the following specific example.

*Example*

A solution is prepared containing 0.025% potassium dichromate in 50% (v./v.) aqueous sulfuric acid. Sufficient silver nitrate is added to the solution to give a 0.025% concentration thereof. 3 mls. of this solution are placed in the test ampoule of a Breathalyzer, an apparatus which is described in an article in Medicine, Science and the Law, October 1961, Sweet and Maxwell, Ltd., London, England. A subject then breathes into a sample chamber until 52.5 ml. of exhaled breath is collected. The sample chamber is kept at a temperature in the range 45–50° C. to avoid condensation of the water vapor present in the breath on the walls of the sample chamber. The volume of exhaled breath is then passed through the dichromate-silver nitrate-sulfuric acid solution maintained at room temperature. After an interval of about 90 sec., the ethyl alcohol present in the breath sample has been quantitatively oxidized to acetic acid, thus providing a decrease in dichromate concentration and hence in the yellow color of the solution which can be readily measured by a photovoltaic cell. The results of the measurement are recorded on a scale which has previously been calibrated to read directly in percent of ethyl alcohol in the blood, the relationship between the amount of ethyl alcohol in a 52.5 cc. sample of alveolar breath of a subject and the amount present in the blood of the same subject having been previously determined.

The invention claimed is:

1. A method for the quantitative determination of ethyl alcohol which comprises adding a sample containing ethyl alcohol to a 40–60% aqueous sulfuric acid by volume solution containing a chromate salt plus a catalytic quantity of a heavy metal, oxidizing the ethyl alcohol present in the sample to acetic acid by means of the oxidizing action of the chromate ion and then measuring the decrease in chromate concentration.

2. The method of quantitatively analyzing for ethyl alcohol in breath which comprises passing a breath sample through an aqueous sulfuric acid solution having a sulfuric acid concentration in the range 40–60% by volume and containing from .05 to 5 grams per liter of a chromate salt plus a heavy metal catalyst in an amount from 25% to 200% of the concentration of the said chromate salt.

3. A composition for the rapid oxidation of ethyl alcohol to acetic acid consisting of a 40–60% aqueous sulfuric acid solution by volume containing from .05 to 5 grams per liter of a chromate salt plus a catalytic quantity of a water-soluble silver salt.

4. In a method for the rapid oxidation of ethyl alcohol to acetic acid, the process step which comprises contacting the ethyl alcohol with an aqueous sulfuric acid solution having a 40–60% sulfuric acid concentration by volume and containing in addition a soluble chromate salt and a catalytic quantity of a heavy metal salt.

5. The method of quantitatively analyzing for alcohol in breath which comprises passing a breath sample into a 50% by volume aqueous sulfuric acid solution containing about .025% by weight of a chromate salt and from .00625% to .05% by weight of a heavy metal catalyst, oxidizing the ethyl alcohol present in the breath sample to acetic acid whereby a stoichiometric amount of the chromate salt is reduced to a chromic salt and then measuring colormetrically the decrease in the amount of chromate salt.

6. The process of claim 5 in which the heavy metal catalyst is a soluble silver salt.

References Cited by the Examiner

UNITED STATES PATENTS 1,878,390 9/32 Franklin.
2,939,768 6/60 Grosskopf _____ 23—252

OTHER REFERENCES

"Catalysis" (Berkman et al.), publ. by Reinhold Corp., 1940, pp. 497, 499 and 790 relied on.

Friedemann et al.: "Chemical Testing Procedures for the Determination of Ethyl Alcohol," J. Am. Medical Association, vol. 170, May 2, 1959 (pp. 120/56 and 129/65–135/71 relied on).

MORRIS O. WOLK, *Primary Examiner.*

JAMES H. TAYMAN, JR., *Examiner.*